United States Patent
Woods

(10) Patent No.: US 7,351,897 B2
(45) Date of Patent: Apr. 1, 2008

(54) WIND INSTRUMENT FINGER EXERCISE DEVICE

(76) Inventor: Marielle Woods, 345 Mountain Ave., Ridgewood, NJ (US) 07450

( * ) Notice: Subject to any disclaimer, the term of this patent is extended or adjusted under 35 U.S.C. 154(b) by 591 days.

(21) Appl. No.: 10/979,051

(22) Filed: Nov. 2, 2004

(65) Prior Publication Data

US 2006/0090630 A1    May 4, 2006

(51) Int. Cl.
*G10D 7/08* (2006.01)

(52) U.S. Cl. .................................... 84/385 A

(58) Field of Classification Search ............. 84/385 A, 84/465, 387 A, 385 R
See application file for complete search history.

(56) References Cited

U.S. PATENT DOCUMENTS

| | | | |
|---|---|---|---|
| 1,136,481 A | | 4/1915 | Ostrovsky |
| 2,621,005 A | | 12/1952 | Turpin |
| 2,990,744 A | | 7/1961 | Brilhart |
| 3,197,188 A | | 7/1965 | Moore |
| 3,447,415 A | * | 6/1969 | Kime .................. 84/465 |
| 3,738,651 A | | 6/1973 | Norman et al. |
| D325,411 S | | 4/1992 | Everly |

* cited by examiner

*Primary Examiner*—Kimberly Lockett
(74) *Attorney, Agent, or Firm*—Carella, Byrne, et al.; Elliot M. Olstein; William Squire

(57) ABSTRACT

A wind instrument manifesting a trumpet and a French horn, for example, is for exercising the fingers includes key plungers arranged on a top wall of a housing with the plungers supported by a movable plate in the housing chamber. Springs are associated with each plunger for providing a resilient load on each plunger manifesting the load on valve operating key plungers of a corresponding wind instrument. A mechanism displaces the plate to place a load on the plungers representing a horn or a trumpet or other instruments. A thumb wheel is provided on a screw in a mechanical mechanism to displace the plate. A reversible DC motor is coupled to a screw in an electrically activated mode to displace the plate in opposite directions by reversing the polarity of a current applied to the motor. Two switches reverse the current polarity. Three plungers are associated with the housing top wall and a fourth plunger manifesting a French horn is associated with a housing end wall for exercising the thumb. A rear wall is curved and the front wall is planar to manifest either a trumpet or a horn depending upon orientation of the device in the user's hand.

21 Claims, 8 Drawing Sheets

WIND INSTRUMENT FINGER EXERCISE DEVICE

This invention relates to finger exercise devices for simulation of fingering devices on wind instruments such as trumpets and horns and so on.

U.S. Pat. No. 2,990,744 discloses a musical wind instrument having three buttons which are spring mounted and which operate valves to control the generation of musical notes. The buttons, which are referred to alternatively as plungers herein, are aligned in a linear array and exhibit a certain spring induced load. The buttons also have a given relative spacing.

U.S. Pat. No. 1,136,481 to Ostrovsky discloses an exercising apparatus for use by musicians for developing muscles of the hand. In particular, disclosed is a linear array of keys (buttons or plungers) connected to pistons and which are spring mounted. The keys are arranged for use by violinists for exercising muscles of the left hand, whose fingers slide along a bar, a frame or stem of the instrument representing a keyboard of the instrument to play different notes of the instrument. The device may also be used by pianists. A movable chin rest is provided for use by violinists or as a support for the hand of pianists. The spring resistance can be changed by replacing the springs or by adjusting the tension thereof using a screw. The springs are removable to make selected keys inoperable. Each spring is independently adjustable in tension.

U.S. Pat. No. 3,738,651 to Norman et al. discloses a finger, hand and forearm developer device having four independently adjustable spring actuated plungers aligned with each other within a casing for compression by four fingers of a hand. The compression of each plunger is adjusted independently of each other to an indicated amount in accordance with the requirement of each finger. Each plunger is associated with a corresponding spring. The device is used to exercise, diagnose or rehabilitate the muscles of a finger or forearm.

U.S. Pat. Des. 325,411 to Everly discloses a musicians grip finger exerciser.

U.S. Pat. No. 3,447,415 to Kime discloses a finger exerciser or musical practice device to simulate the valve actions of a trumpet or similar wind instrument. The device comprises a housing having a chamber containing three valve means to simulate the valves of a trumpet or other musical wind instrument. A stem is associated with a corresponding spring mounted in the housing chamber. A bushing 20 is at the bottom of each spring and may be clamped in different positions to adjust the tension of the spring of the corresponding valve device. The bushing is clamped by a thumb screw which moves in a slot in the housing wall. By tightening or loosening the screw, the bushing may be moved up and down in the chamber to adjust the tension on the corresponding spring.

U.S. Pat. No. 2,621,005 to Turpin discloses a vibration control for piping and the like includes a rod in a casing with a bearing member bearing against a spring in the casing. The rod is attached to a pipe to damp vibrations in the pipe.

U.S. Pat. No. 3,197,188 to Moore discloses a holddown shock absorber for the mold board of an earth grader.

The problem with the above noted devices in respect of providing an exercise device for the fingers for simulation of musical wind instrument valve operating keys or plungers is that they do not have housings that relate to simulating the different external configuration of different musical instruments such as a trumpet or French horn, for example. In addition, they disclose independent adjustment of individual keys or valve operating plungers, which make it difficult and at least cumbersome to provide identical tension on each key or plunger as exists in conventional instruments without exercising a high degree of care during the adjustment. In addition, the keys representing valve operating plungers for a wind instrument are only arranged in a configuration for simulating one kind of instrument. Others of the disclosed devices are not particularly useful for wind instruments having valve operating plungers.

The present inventor recognizes the nature of the above problems and provides a solution with the present invention.

A finger exercise device for a wind instrument according to one embodiment of the present invention comprises a housing having a chamber defined by a planar front wall and an arcuate opposite rear wall defining a longitudinal axis therebetween, a top wall, and a bottom wall, the axis extending in the region between the top, bottom, front and rear walls, the arcuate wall manifesting the configuration of a horn wind instrument and the planar wall manifesting a different wind instrument such as a trumpet for example. A plurality of finger exercising resiliently mounted first plungers are associated with the top wall and depend from the top wall into the cavity between the front and rear walls, each plunger simulating the spacing, configuration and load on the valve operating plungers of a corresponding wind instrument, all of the first plungers manifest the spring tension and spacing of the corresponding plungers of a horn and a different wind instrument. The curved rear wall may manifest a French horn instrument and the planar opposing wall may manifest a trumpet for example. An optional plunger on a further wall may represent a horn instrument by way of example.

A finger exercise device according to another embodiment of the present invention comprises a housing having a chamber defined by a plurality of walls including a front and an opposite rear wall defining a longitudinal axis therebetween, a top wall, a bottom wall and opposite end walls, the axis extending through the end walls. A first plurality of finger exercising resiliently mounted first plungers are aligned in an array in a plane passing through the axis, each plunger simulating the spacing, configuration and load on the valve operating plungers of a corresponding wind instrument, the first plungers being associated with the top wall and extending into the cavity between the front and rear walls. At least one further resiliently mounted plunger is associated with a further wall different than the top wall and extends into the cavity between the front and rear walls, all of the plungers manifesting the spring tension and spacing of corresponding valve operating plungers on a given wind instrument.

A finger exercise device for a wind instrument according to a further embodiment of the present invention comprises a housing having a chamber defined by a plurality of walls including a front and an opposite rear wall defining a longitudinal axis therebetween, a top wall, a bottom wall and opposite end walls, the axis extending through the end walls. A first plurality of finger exercising resiliently mounted first plungers are aligned in an array in a plane passing through the axis, each plunger simulating the spacing, configuration and load on the valve operating plungers of a corresponding wind instrument, the first plungers being associated with the top wall and extending into the cavity between the front and rear walls. A mechanism is included for adjusting the tension on the first plungers simultaneously.

IN THE DRAWING

In the various figures, the drawings are not to scale. It should be understood that the apparatuses depicted in the various figures are intended to represent actual instrument finger plunger dimensional relationships. Such relationships are intended for the associated named instrument such as a trumpet or horn, for example, given by way of example herein. Such dimensional relationships are well known and are not given herein except to assist the reader in understanding certain of the fingering relationships in the context of a particular embodiment.

Figure 1:
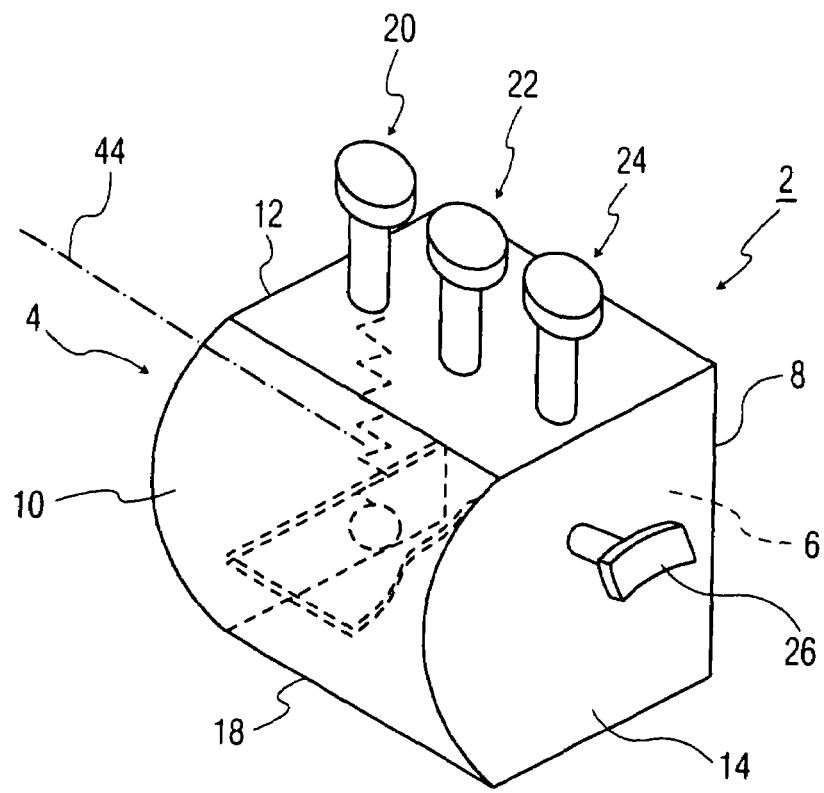
FIG. 1 is an isometric view of a finger exercise device according to an embodiment of the present invention.

In FIG. 1, wind musical instrument finger exercise device 2 comprises a housing 4 defining an interior chamber 6. The housing comprises a rear wall 8, a front wall 10, two opposite end side walls 12 and 14, a top wall 16 and a bottom wall 18. The walls may be interconnected by any conventional fastening arrangements such as adhesives, screws, rivets, brackets, weld and the like (not shown). If made of plastic, the housing walls may be molded one piece with one wall hinged to another wall and latched in place by a latch device (not shown) as used in typical plastic molded thermoplastic boxes for example.

Plungers 20, 22 and 24 represent keys coupled to valves of a wind instrument for creating musical notes and penetrate the top wall 16 via openings therein. The plungers typically are spaced apart distance $d_1$ of about ¼ inch in certain instruments, such as a trumpet or horn, for example.

An opening corresponds to each plunger and a single end plunger 26 penetrates the end wall 14, all of the plungers having a portion outside and inside the chamber 6. The plungers 20, 22, 24, and 26 manifest valve operating keys or plungers of a corresponding wind instrument such as a trumpet or French horn. The plungers have circular cylindrical heads 21 of about ½ inch diameter in the instruments of interest herein. The end wall plunger 26 for example may be associated with the thumb, while the plungers 20, 22 and 24 may be associated with the index finger and the middle two fingers between the index and pinky fingers. The plunger 26 for a horn instrument is spaced a distance d from the next adjacent plunger 24 of the array of plungers 20, 22 and 24. Distance d is typically about one inch. The spacing and orientation of plunger 26 is representative of the spacing and orientation of a similar plunger in a horn, for example.

The plungers exhibit spring pressures closely corresponding to the spring pressures of the associated wind instrument keys or plungers. Additionally, it is preferred the plungers extend from the housing a distance corresponding to the distance of the plungers of corresponding wind instruments to closely simulate the plunger position, e.g., its height above the top wall, spacing and so on as well as spring pressure on such plungers of the representative instruments.

Figure 4:
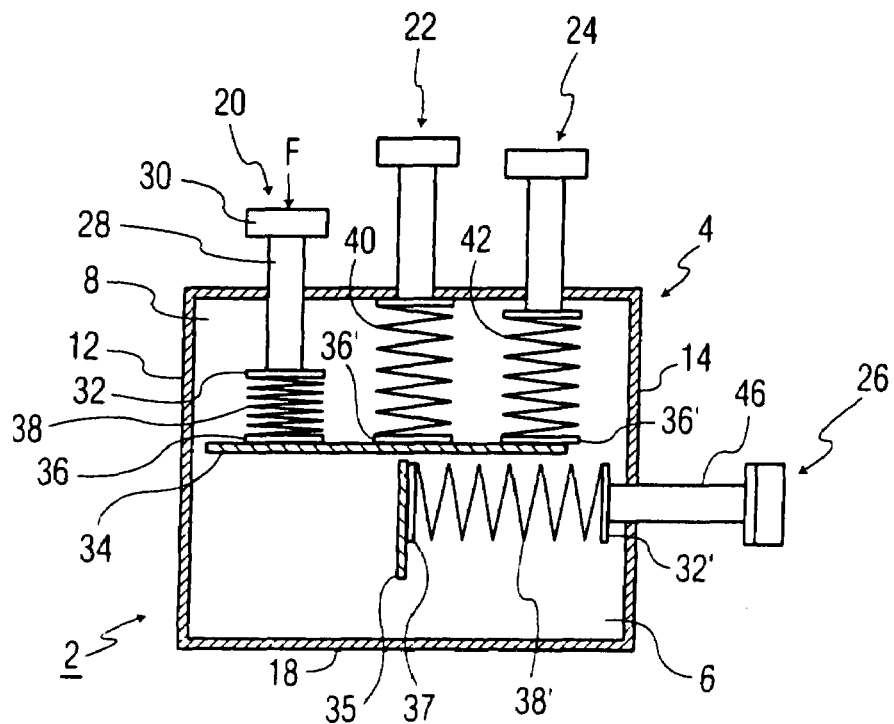
FIG. 4 is an elevation sectional view of the device of FIG. 5 taken at lines 4-4.
Figure 4A:
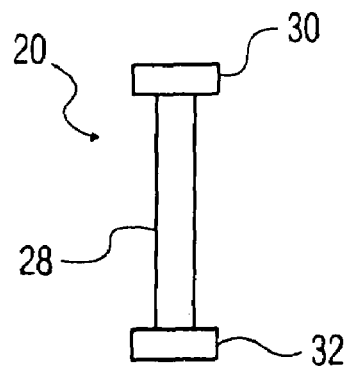
FIG. 4a is a side elevation view of a representative plunger used in the embodiment of FIGS. 1-4.
Figure 5:
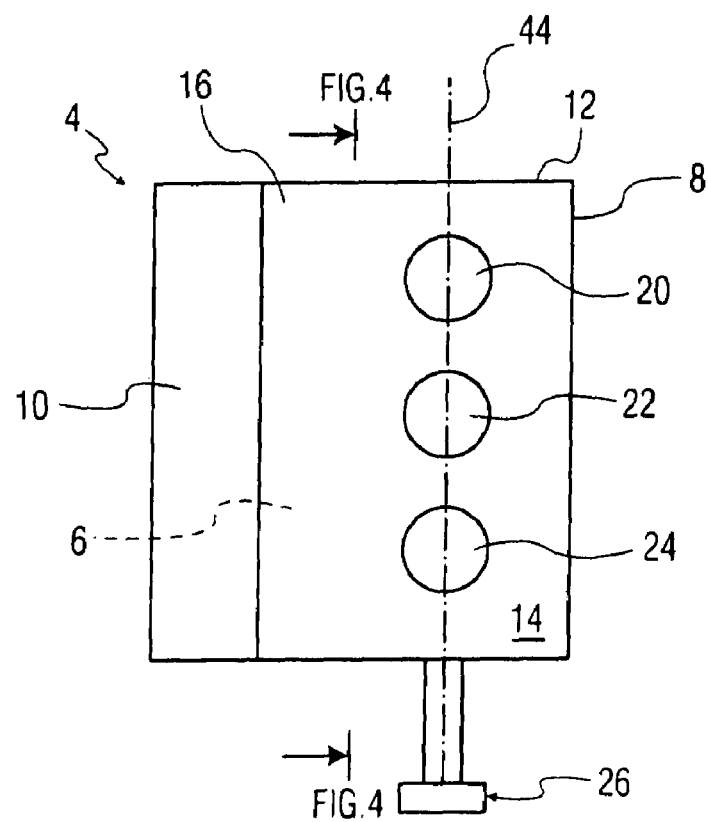
FIG. 5 is a top plan view of the device of FIG. 1.

In FIG. 4a, representative plunger 20 comprises a stem 28 which preferably is a circular cylindrical member of plastic or metal, having a circular cylindrical head 30 at one end. The head 30 may be threaded or pinned to the stem 28. The head 30 receives the finger of the user and may be contoured on its top surface if desired such as by providing a concavity (not shown) in the top outer surface receiving the finger tip of the user. The other bottom end of the stem 28 is also threaded or otherwise arranged to receive a spring mounting plug 32. The plug 32 is a circular cylinder of metal or plastic and may include a hole (not shown) for receiving and securing the end of a coil spring.

In FIG. 4, located in the chamber 6 are support member plates 34 and 35 which may be of any material such as metal or plastic. The plates 34 and 35 are sheet material and are fastened stationary to one or more of the housing side, front and rear walls. The plate 34 may overlie the entire cross section area of the chamber 6 if desired, but this is not necessary. Plate 34 is parallel to the bottom wall and normal to the end walls. Plate 35 is oriented normal to plate 34 so that the planes of their respective surfaces are perpendicular to each other. Mounted on the plate 34 are three plugs 36, which may be identical to or similar to plug 32 on plunger 20, FIG. 4a. The plugs 36, 36' may be secured to the plate 34 by any convenient and suitable fastening arrangement. For example, if the plate 34 is molded sheet plastic, the plugs 36 may be molded integral and one piece with the plate 34. The plugs 36 preferably have a hole to receive an end of a coil spring. A plug 37 is mounted on plate 35 and is similarly shaped as plugs 36 and may be of the same or different size according to a given implementation in this embodiment.

A coil spring 38, preferably metal, but which may be other materials, such as plastic or a solid elastomeric material plug like element, and the like, has an internal diameter which closely receives the plugs 32 and 36 and also receives a respective corresponding stem of a plunger. A coil spring 38' is similarly mounted to plug 32' of plunger 26 which may be dimensioned the same as or differently than plungers 20-24. The coil spring 38' is attached to plug 37 mounted on plate 35. The coil springs which may be spring wire have an end inserted into the hole (not shown) in each of the plugs.

Figure 2:
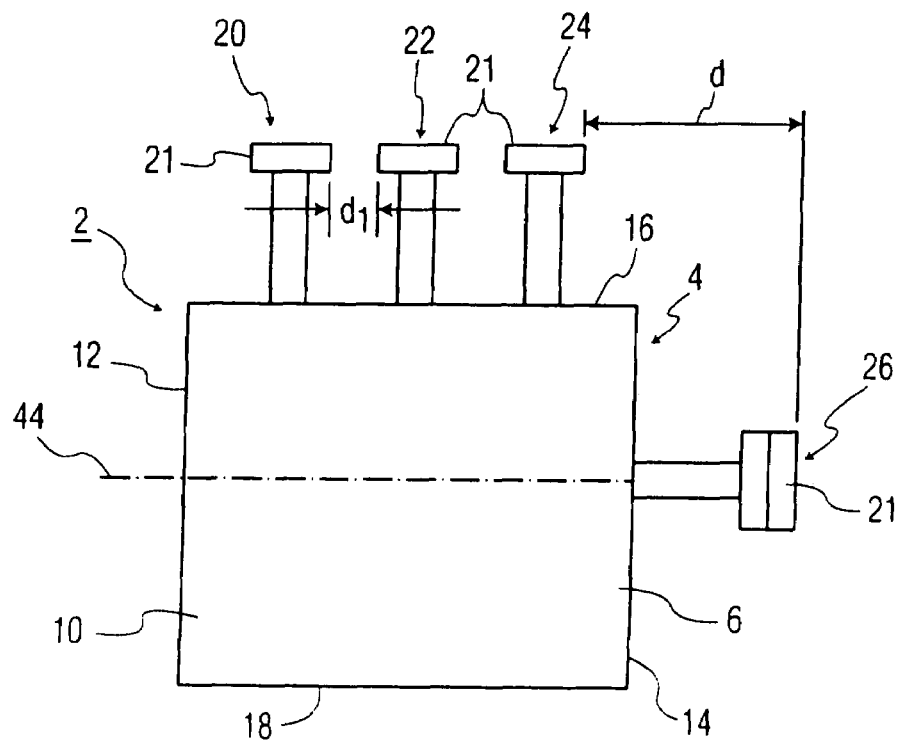
FIG. 2 is a front elevation view of a portion of the device of FIG. 1.
Figure 3:
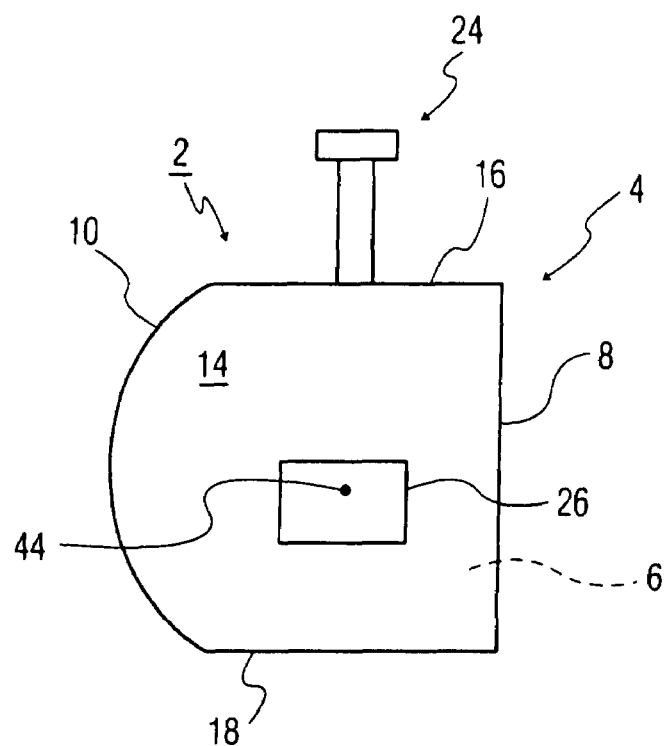
FIG. 3 is a side end elevation view of the device of FIG. 1.

The coil spring 38 associated with plunger 20 is illustrated compressed with the plunger depressed for purposes of illustration. The spring associated with plunger 24 is also shown partially depressed. In practice, the plungers and springs are not depressed until done so by a finger force F of the user and will normally be positioned at its outer most position represented by plungers 22 and 26. Springs 40 and 42 associated with respective plungers 22 and 24 are preferably identical to spring 38 as are the plungers 20, 22, and 24. These plungers are aligned in a linear array and lie in a plane passing through the longitudinal axis 44 of the housing 4, the axis passing between the top, bottom, front and rear walls and through the end walls 12 and 14, FIG. 2.

End wall plunger 26, FIG. 4, has a stem 46 and a head 50 and represents a French horn key or plunger. The plunger 26 stem 46 is connected to the movable plug 32', which is connected to the end of the spring 38' so as to compress this spring when the plunger 26 is depressed. The plug 32' thus is fixed to the plate 35 as are the plugs 36 fixed to plate 34. The stem 46 of the plunger 26 passes through an aperture in the side wall 14. The plugs 36, 32 are aligned vertically in the drawing FIG. 4 from top to bottom of the figure with the openings in the housing top wall 16 receiving the stems of the corresponding plungers. Depressing the plungers will compress the corresponding springs. The springs 38, 40 and 42 are preferably identical so as to exhibit the same spring load on the respective plungers. The spring 38' may have the same or different spring load as the other springs 38, 40 and 42.

In operation, the user may place the planar rear wall 8 in the palm of the hand so that the plunger 24 represents the portion of the instrument closest to the user's face. The curved front wall 10 faces away from the palm. This orientation manifests a trumpet. By reversing the orientation of the device 2 so that the arcuate wall 10 is in the palm of the users hand, and the planar wall 8 faces away from the palm, the plunger 20 represents the portion of the instrument closest to the users face. This time the device 2 manifests a horn instrument. The plunger 26 is used by horn players who play a French horn and play a double horn. The flat side wall 8 of the device 2 is for trumpet players and the curved side wall 10 is for horn players.

The convex curvature of the wall 10 is a segment of a circular cylinder, but may have other curvatures as desired for manifesting a given horn or other instrument. The curvature is dimensioned to approximately match that of a given instrument represented by this wall.

Because French horns and trumpets have different plunger characteristics with respect to the pressure exerted by the springs on the plungers, i.e., the pressure on the plungers is lower for trumpets than French horns. It is desirable that not only the exterior of the device manifest a given instrument, but also the spring pressure or loads on the plungers should also manifest the same instruments. To this extent, the spring forces exerted by the springs is preferably adjusted by adjusting the lengths of the respective coil springs. To this extent the thumb plunger 26 on the side wall 14 may be secured to a plate 35 which is stationary. But this plate could also be adjustable as shown hereinbelow as desired. By compressing the springs to different pressures with an adjustment mechanism as shown below, the spring loads on the plungers 20, 22 and 24 can be increased for exercise use by horn players, for example. As noted previously, the figures are not to scale and the actual placement of the plungers relative to each other is made to correspond to the representative instrument being simulated.

Figure 6:
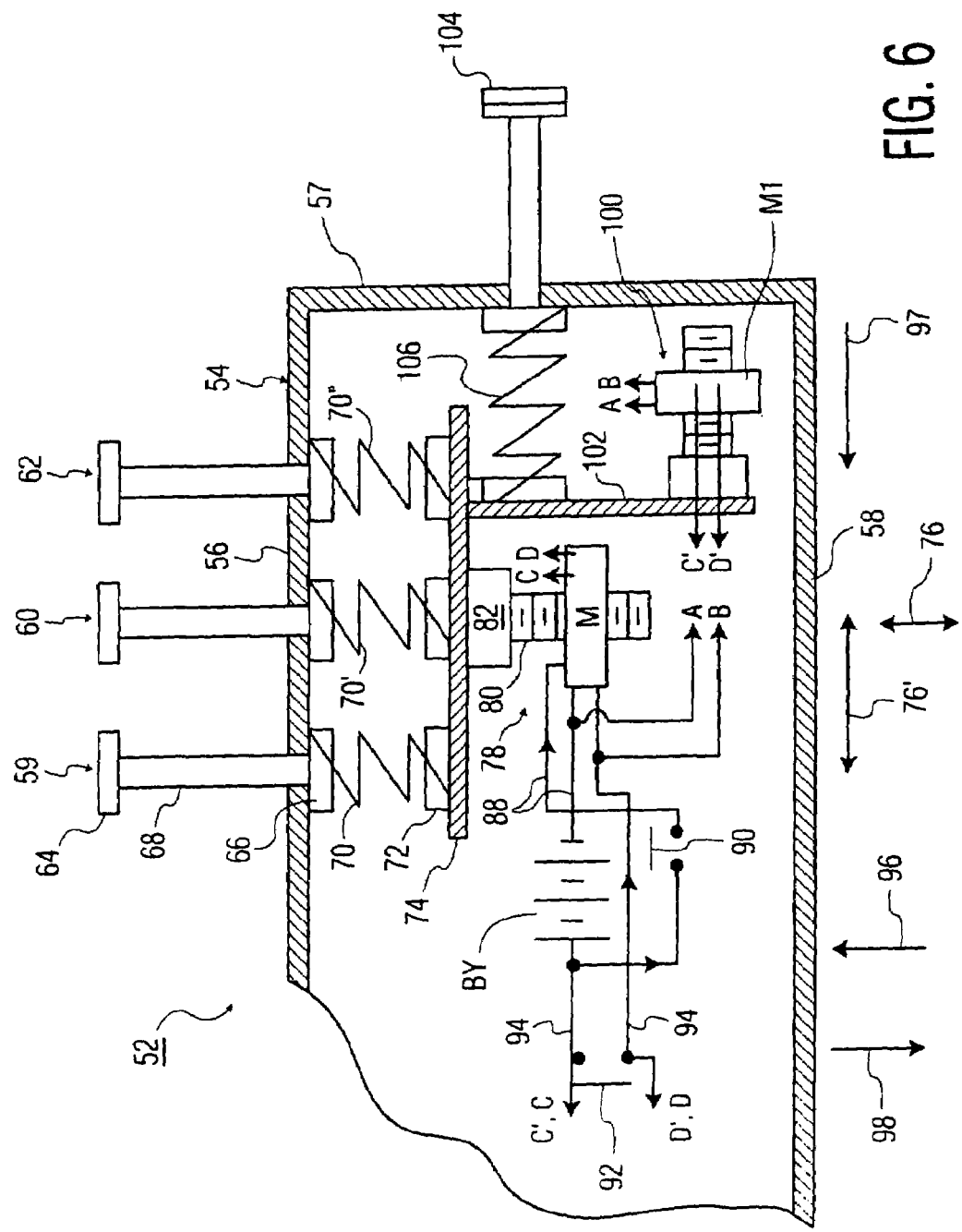
FIG. 6 is a side elevation sectional view of a finger exercise device according to a further embodiment.

FIG. 6 illustrates an electrically activated adjustable exercise device wherein the spring loads on the plungers is controlled and adjusted electrically to represent different instruments such as a trumpet and French horn. When a trumpet is used, the plungers exhibit less pressure than a French horn. The trumpet does not need the plunger 104 so this plunger is optional with respect to the need to adjust its pressure.

In FIG. 6, device 52 has a housing 54 having a top wall 56, an end wall 57 and a bottom wall 58, the other end wall not being shown. Three aligned preferably identical plungers 59, 60 and 62 are attached to the housing as in the embodiment of FIG. 1. Representative plunger 59 has a head 64, a plug 66 and a stem 68 to which the head and plug are attached as previously described in connection with the embodiment of FIG. 1. A coil spring 70 of a predetermined load characteristics suitably matched for the instruments involved receives the stem 68. One end of the spring 70 is attached to the plug 66 and the other end is attached to plug 72 as also previously described in connection with the FIG. 1 embodiment. The plug 72 is affixed to plate 74. Each of the remaining plungers 60 and 62 are affixed identically to the plate 74 in the desired spaced relationship manifesting a given wind instrument. The springs are all also preferably identical to manifest the spring load of such a given instrument.

Figure 7:
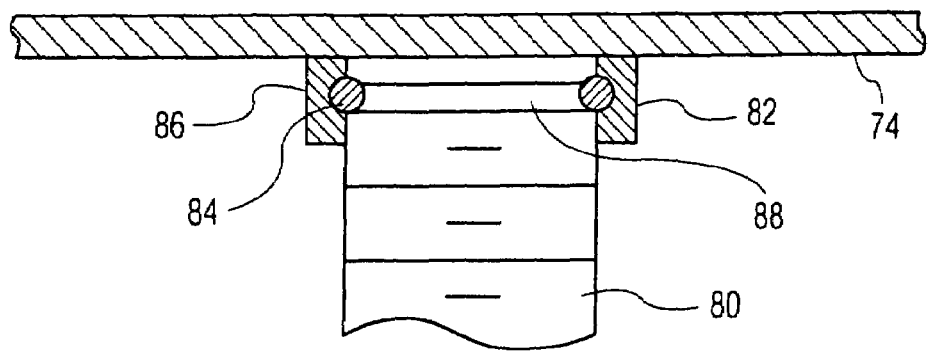
FIG. 7 is a sectional elevation view of a portion of the embodiment of FIG. 6 showing the engagement of the motor driven screw to the capturing seat on the adjustment platform for the exercising finger plungers.

The plate 74 is movable in directions 76 by electrically activated actuating mechanism 78. Such movement adjusts and sets the compression of each of the springs 70, 70' and 70" of the respective plungers 59, 60 and 62, which are preferably identical. The plate 74 may be metal or plastic. Mechanism 78 includes a screw 80 which is rotatably mounted in a bearing 82 and retained therein by a retaining split spring ring 84, FIG. 7. Bearing 82 may be fabricated of hardened steel, for example, or plastic materials such as engineering plastics as known in the plastics art. The bearing 82 has a groove 86 in which the split spring retainer ring 84 is resiliently retained. The screw 80 has a groove 88 aligned with the groove 86 and also resiliently receives the retainer ring 84. The screw snap fits onto the retainer ring which allows the screw to rotate and yet remain fixed to the plate 74 for displacing the plate 74 as the screw 80 is rotated.

The mechanism 78 further includes a motor M which is fixed to a housing 54 wall (in a manner not shown or to any other structure attached to the housing). The screw 80 is rotatably driven by the motor M. For example the screw and motor may contain mating worm or other engaging rotating threads or similar engaging elements for rotating the screw relative to the motor and to the housing. Other rotation mechanisms as known may also be used. Rotation of the screw causes the screw and the plate to displace in a selected one of directions 76 according to the direction of rotation of the screw.

The motor M is electrically driven by a battery BY via lines 88 and switch 90. Switch 90 may be a normally open push button which causes the motor to rotate in one direction. Normally open push button switch 92 connects the battery BY to the motor via lines 94 to reverse the polarity of the DC current applied to the motor M with respect to switch 90 to reverse the motor direction of rotation. This thereby moves the plate 74 in the opposite direction. The various wires C, D, C', D' show the connections of the wires in the circuit. If switch 90 moves the plate upward in direction 96 (increase the pressure on the plungers), switch 92 moves the plate 74 down in direction 98 to decrease the pressure on the plungers.

Plate 102 is movably mounted to mechanism 100 which is similar to mechanism 78 in that it includes a screw, a bearing with a retaining ring for rotatably securing the screw to the plate 102 and a DC motor M1 which rotates the screw relative to the plate 102 to raise or lower the plate 102 in similar fashion to and in synchronism with mechanism 78. Plunger 104 may be identical to plungers 59, 60 and 62 or may differ therefrom to manifest a French horn key plunger, for example. The plunger 104 is spring loaded coupled to plate 102 by coil spring 106 and may be identical to the other plungers. As the plate 102 displaces in direction 98, the spring 106 is compressed increasing the pressure load on the plunger 104 and when moved in direction 97 the pressure on the spring 106 is reduced. Both motors M1 and M are connected to the battery BY via the same connections represented by wires C, D and C', D' so that depressing one of the switch push buttons 90 or 92 displaces the plates 74 and 102 simultaneously in that direction, which either increases or decreases the spring load on all of the respective plungers simultaneously to the same value or to different values according to a given implementation.

Figure 14:
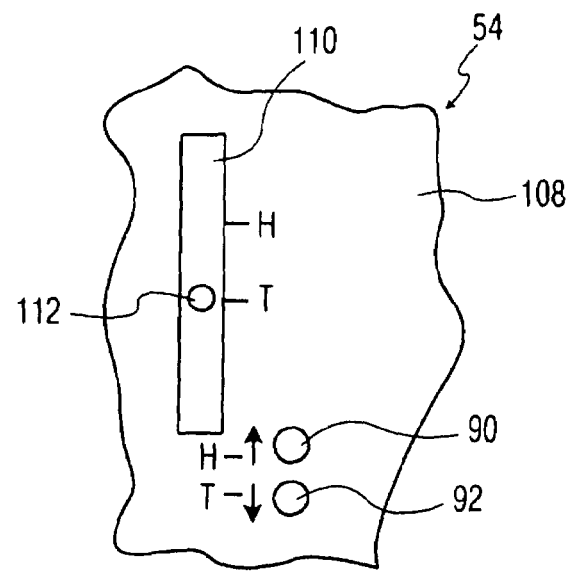
FIG. 14 is a fragmented side elevation view of a portion of the device of FIG. 13 showing the indicia indicator manifesting the adjustment position of the device at a given spring load on the fingers for a trumpet finger exercise.

In FIG. 14, housing 54 has a wall 108 with a slot 110. The wall has indicia letters H and T representing French horn and trumpet respectively, for example. A pointer 112 is attached to one of plates 74 or 102, FIG. 6, so that the pointer position represents the position of the plates. The pointer 112 points to either the H or T indicia to show when the plates 74 and 102 are at either the horn or trumpet position for example. Other instruments having other plate positions manifesting their plunger spring loads could also be indicated by the pointer (in a manner not shown). The switch push buttons 90 and 92 are on the wall 108 and have indicia INCR and DECR and associated arrows indicating which switch moves the plate up or down to respectively increase or decrease the pressure on the plungers for the respective instruments. IN the alternative, the thumb plunger 104 may be attached to a fixed plate (not shown) while plate 74 is movable as shown in FIG. 6 or may be attached to an adjustment mechanism (not shown) similar to mechanism 100 of FIG. 6 but operated independently of plate 74 by separate wiring and switch arrangements connected to the battery BY to thereby independently set the pressure on plunger 104 different than that set on the other plungers.

Figure 13:
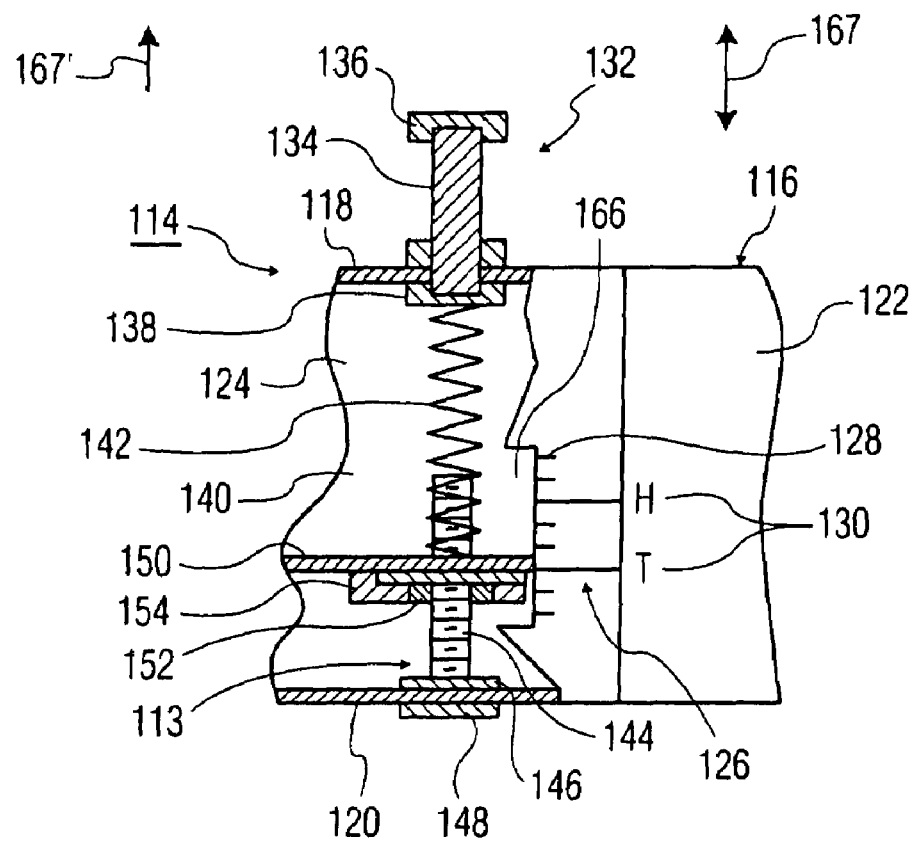
FIG. 13 is a fragmented partially in section elevation view of a device according to a further embodiment of the present invention.

In FIG. 13, an alternative embodiment of a finger exercising device 114 comprises a mechanical device 113 for simultaneously adjusting the spring tension load on three aligned plungers 136 (only a representative one of which is shown) of the exercising device 114. The plungers 136 are attached to the top wall 118 in an orientation as shown in the embodiment of FIG. 1. The device 114 includes a housing 116 which has a top wall 118, a bottom wall 120, a planar rear wall 122 with a channel to be described below, a planar front wall 124, which may be arcuate as shown in the embodiment of FIG. 1, and side walls (not shown). The rear wall 122 has indicia 126 which include an array of spaced lines 128 and nomenclature 130 identifying a particular wind instrument such as a trumpet and horn by way of example. Other types of wind instruments may also be included in the indicia according to a given implementation.

Plunger 132 comprises a stem 134, a head 136 and a plug 138 attached to the stem inside the housing 116 cavity 140. A coil spring 142 is attached to the plug 138 as described in the above embodiments.

The mechanical device 113 includes a screw 144 which is fastened stationary to the bottom wall 120 by a nut 146 which clamps the screw by clamping wall 120 to the screw head 148. The screw 144 passes through an aperture in planar plate 150 which may be metal or thermoplastic sheet material. Rotatably secured to plate 150 is a rotatable knurled nut 152 which is threaded to the screw 144. The nut 152 is captured to plate 150 by a retainer ring 154.

Figure 13A:
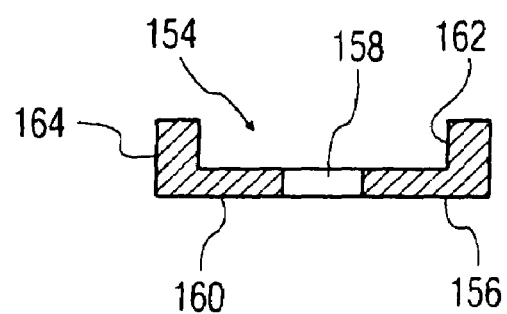
FIG. 13a is a more detailed sectional side elevation view of a retaining ring of the embodiment of FIG. 13.

In FIG. 13a, ring 154 has a bottom annular wall 156 with a central hole 158 for receiving therethrough the screw 144 (FIG. 13). An annular rim 160 is attached to the wall 156 outer periphery to define a circular cylindrical recess 162, which rotatably receives the circular cylindrical nut 152, FIG. 13. The rim 160 is attached to a plate 150 threaded bore by threads 164 on the ring 54 exterior periphery. Rotation of the nut 152 displaces the plate 150 and the nut 152 in directions 166. The nut 152 is aligned with indicia 126 and visible through the front wall 122 via a slot 166. The nut 152 is a relatively thin washer and serves as a pointer to the indicia 126 when aligned therewith. The coil spring 142 receives the screw 144 in the interior of the spring and abuts the plate 150. The spring 150 is compressed as it is in all of the above embodiments for the corresponding plungers and applies a pressure against the plunger 132 plug 138 to force the plunger upwardly, FIG. 13, in direction 167' and against the plate 150 forcing the plate in the opposite direction (directions 167).

Figure 10:
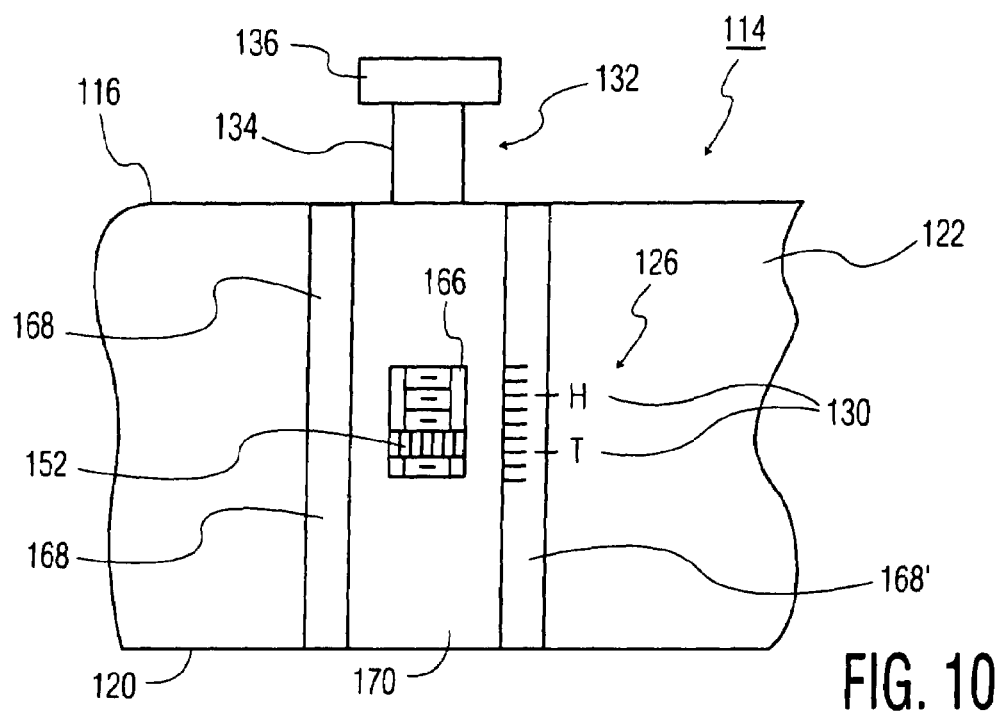
FIG. 10 is a side elevation fragmented view of a device according to a further embodiment.
Figure 11:
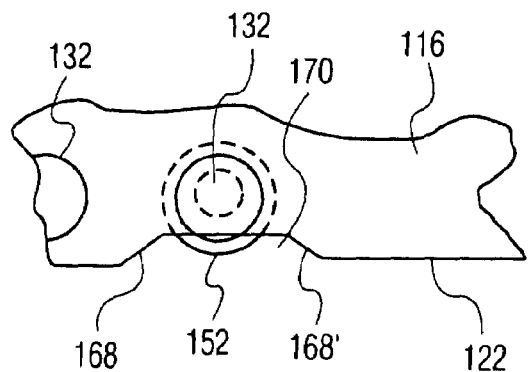
FIG. 11 is a top plan fragmented view of a portion of the device of FIG. 10.

In FIGS. 10 and 11, the front wall 122 of device 114 is formed with inclined portions 168, 168' forming a channel 170. Slot 166 is located in the channel 170 and arranged so that a portion of the nut 152 protrudes therefrom as shown in FIG. 11. The indicia 126 is next to the slot 166 and imprinted on the wall 122 portion 168' and wall 122.

In operation, as the nut 152 is rotated, the plate 150, FIG. 13, will displace in either of directions 166 according to the direction of rotation of the nut. The nut 152 is rotated until it is aligned with the desired instrument indicia H (horn) or T (trumpet) by way of example or any other instrument as may be desired. the plate 150 is also aligned to the position at which the desired spring load on the three plungers 132 (only one being shown in FIG. 10) is reached. The pressures on all of the plungers 132 are same in this embodiment and are adjusted simultaneously as the plate 150 is displaced.

Figure 8:
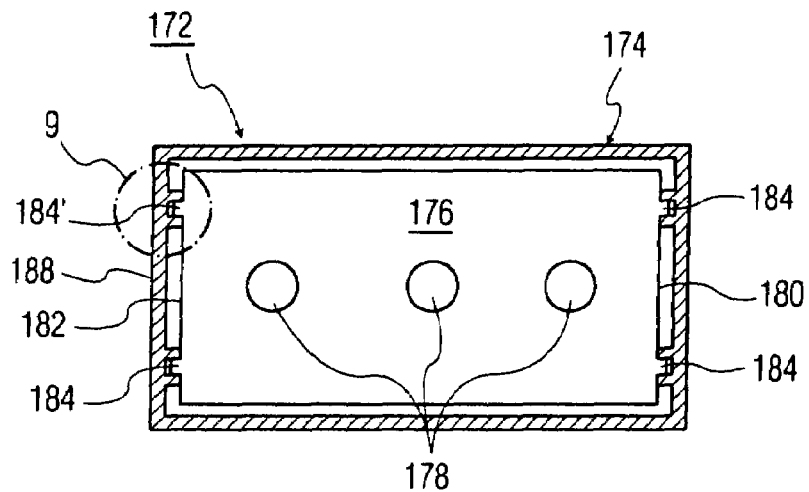
FIG. 8 is a top plan sectional view of a device according to a further embodiment of the present invention.
Figure 9:
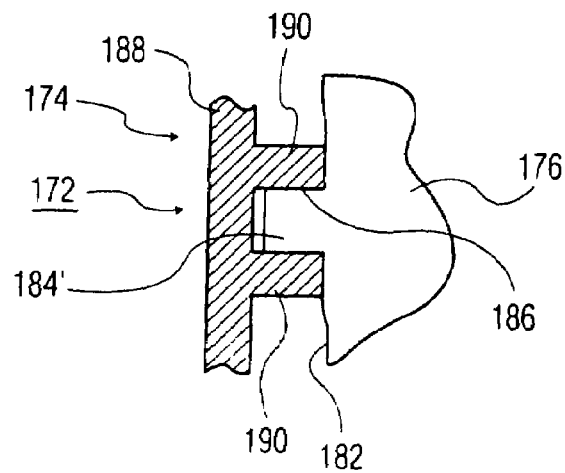
FIG. 9 is a more detailed sectional view of the region 9 of FIG. 8.

In FIGS. 8 and 9, an alternative embodiment of a device 172 may have a housing 174 and a movable plate 176. Attached to the plate 176 are three plungers 178 which may be constructed according to the embodiments previously discussed hereinabove. The plate 176 is displaced by any of the previously described mechanisms. Plate 176 has two opposing edges 180, 182. There are a plurality of like spaced ribs 184, 184' at the edges 180, 182, two ribs per edge. In FIG. 9, a representative rib 184' is shown. The rib 184' is rectangular or square and mates in a corresponding shaped channel 186 formed on the interior side of a side wall 188 of the housing 174. The channel 186 is formed by two spaced ribs 190. There are a total of four channels 186 each receiving a corresponding rib 184, 184'. The channels extend for a length corresponding to the expected displacement length of the plate 176 along the side walls in a direction generally normal to the top and bottom walls of the housing, normal to the plane of the drawing sheet, FIG. 8. The ribs 184, 184' slide in the channels 186 when the plate 176 is displaced by the displacement mechanism (not shown). The ribs and channels thus serve as a guide device for the plate as it is displaced.

Figure 15:
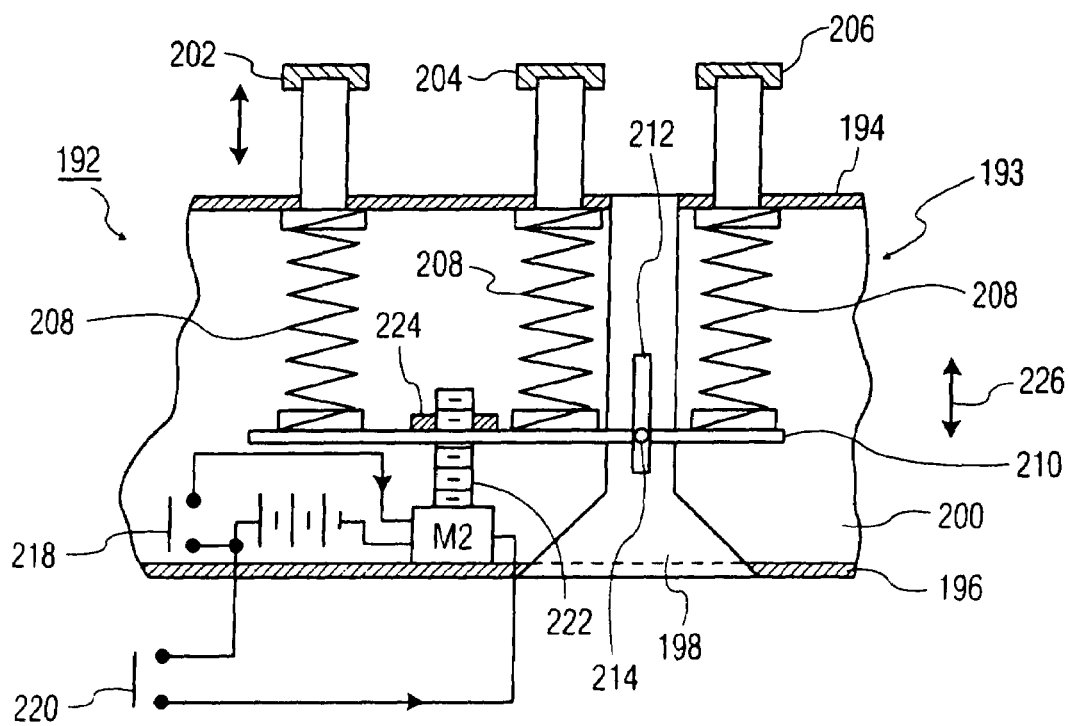
FIG. 15 is a side elevation sectional view of a device according to a further embodiment of the present invention.

In FIG. 15, an alternative embodiment is disclosed which includes a simulation finger exercising device 192 having a housing 193. The housing 193 has a top wall 194, a bottom wall 196, a front wall 198 and a rear wall 200, the side walls not being shown. Three plungers 202, 204 and 206 of identical structure are attached to the top wall for reciprocating motion as described in connection with the embodiment of FIG. 1. The plungers are spring loaded by springs 208. The springs are mounted on movable plate 210.

Figure 12:
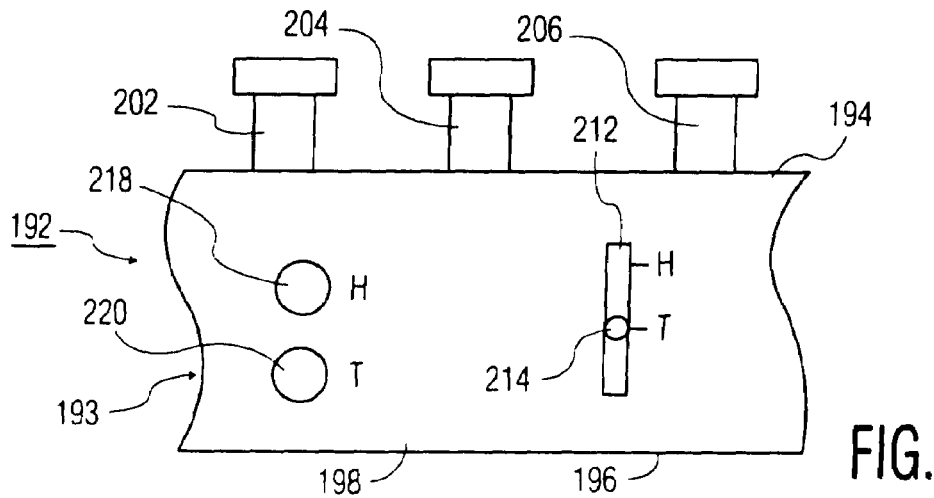
FIG. 12 is a fragmented front elevation view of the device of FIG. 6.

The front wall 198 has a slot 212, FIGS. 12 and 15. A pointer 214 is attached to plate 210 and is located in the slot 212. Indicia such as shown in FIG. 14 are adjacent to the slot 212 for indicating the position of the plate 210 and thus indicating the pressure on the plungers exerted by the springs 208 for a given instrument represented by the letters H (horn) and T (trumpet) as shown in FIG. 12.

A DC motor M2 is fixed to the bottom wall 196 (or to the front wall as desired for a given implementation or in any other suitable manner to structure connected to the housing). A battery 216 supplies electrical power to the motor M2 via push button switches 218 and 220 which are coupled to the battery to reverse the polarity of current to the motor M2 to reverse the direction of rotation of the motor and thus the direction of displacement of the plate 210. The motor rotatably drives screw 222. The screw is threaded to nut 224 fixed to plate 210. As the screw 222 rotates, it causes the plate 210 via the nut 224 to displace in a selected one of directions 226 in accordance with which of switches 218 and 220 is depressed. The sole support of the plate 210 is the screw 22. The push button switches 218 and 220 are shown attached to the front wall 198, FIG. 12, in this embodiment and marked with indicia H for the horn and T for the trumpet.

It will occur to those of ordinary skill that the disclosed embodiments may be altered to provide still further embodiments, the invention being not limited to the disclosed embodiments. For example the thumb plunger 26 of FIG. 1 may be on a bottom or other wall if desired to provide a different exercise for the thumb for example. It is intended that the invention be defined by the appended claims.

What is claimed is:

1. A finger exercise device for a wind instrument comprising:
    a housing having a chamber defined by a planar front wall and an arcuate opposite rear wall defining a longitudinal axis therebetween, a top wall, and a bottom wall, the axis extending in the region between the top, bottom, front and rear walls, the arcuate wall manifesting the configuration of a horn wind instrument and the planar wall manifesting a different wind instrument; and
    a plurality of finger exercising resiliently mounted first plungers associated with the top wall and depending from the top wall into the chamber between the front and rear walls, each plunger simulating the spacing, configuration and resilient bias load on resilient bias loaded plungers of a corresponding wind instrument, all said plungers manifesting the resilient bias load and spacing of corresponding resilient bias loaded valve operating plungers on the horn and on the different wind instrument.

2. The device of claim 1 wherein the arcuate rear wall is a segment of a circular cylinder.

3. The device of claim 1 including a support member in the chamber and a plurality of springs mounted on the support member, each spring coupled to a different plunger for providing the resilient bias load on each plunger, the load on each plunger manifesting a corresponding resilient bias load on the finger plungers of a corresponding wind instrument.

4. The device of claim 1 including an adjustment mechanism in the chamber and associated with each plunger for adjusting the resilient bias load on each plunger.

5. The device of claim 4 wherein the adjustment mechanism includes elements to adjust the resilient bias load substantially equally and simultaneously on all of the plungers.

6. The device claim 4 wherein the adjustment mechanism is electrically activated.

7. The device of claim 4 wherein the adjustment mechanism is mechanically activated.

8. The device of claim 1 wherein the housing further including opposing end walls and a further resiliently mounted plunger extending into the chamber and associated with a further wall comprising one of said end, bottom, front and rear walls.

9. The device of claim 3 including an actuating mechanism coupled to the support member for adjusting the support member position in the chamber to adjust the resilient bias load on at least some of the plungers simultaneously to the same value.

10. The device of claim 9 wherein the actuating mechanism is activated by one of mechanical and electrically activation devices.

11. The device of claim 8 wherein the further wall is one of the bottom and end walls.

12. A finger exercise device for a wind instrument comprising:
    a housing having a chamber defined by a plurality of walls including a front and an opposite rear wall defining a longitudinal axis therebetween, a top wall, a bottom wall and opposite end walls, the axis extending through the end walls;
    a first plurality of finger exercising resiliently mounted first plungers aligned in an array in a plane passing through the axis, each plunger simulating the spacing, configuration and resilient bias load on resilient bias loaded plungers of a corresponding wind instrument, the first plungers being associated with the top wall and extending into the chamber between the front and rear walls; and
    at least one further resiliently mounted plunger associated with a further wall of said plurality of walls different than the top wall and extending into the chamber between the front and rear walls, all said plungers manifesting the resilient bias load and spacing of corresponding resilient bias loaded valve operating plungers on a given wind instrument.

13. The device of claim 12 including at least one support member in the chamber and a plurality of springs mounted on the at least one support member, each spring coupled to a different first plunger for providing a resilient bias load on each first plunger, the load on each first plunger manifesting a corresponding resilient bias load on the finger plungers of a corresponding wind instrument, and a resilient bias load actuating mechanism in the chamber and associated with a second plurality of plungers for displacing the at least one support member to set the resilient bias load on each plunger of the second plurality to a predetermined value corresponding to a resilient bias load on the second plurality of plungers of each of a given wind instrument of a plurality of wind instruments.

14. The device of claim 13 wherein the actuating mechanism includes one of mechanical and electrical activation device.

15. A finger exercise device for a wind instrument comprising:
    a housing having a chamber defined by a plurality of walls including a front and an opposite rear wall defining a longitudinal axis therebetween, a top wall, a bottom wall and opposite end walls, the axis extending through the end walls;
    a first plurality of finger exercising resiliently mounted first plungers aligned in an array in a plane passing through the axis, each plunger exhibiting a resilient bias load simulating the spacing, configuration and resilient bias load on valve operating plungers of a corresponding wind instrument, the first plungers being associated with the top wall and extending into the chamber between the front and rear walls; and a mechanism for adjusting the resilient bias load on said first plungers simultaneously.

16. The exercise device of claim 15 including at least one further resiliently mounted plunger associated with a further wall selected from one of said plurality of walls different than said top wall and extending into the chamber between the front and rear walls, all said plungers manifesting the resilient bias load and spacing of corresponding plungers on a wind instrument.

17. The exercise device of claim 15 wherein the mechanism includes a support member for adjusting the spring tension load on the first plurality of said plungers simultaneously.

18. The exercise device of claim 15 wherein the mechanism is electrically activated.

19. The exercise device of claim 16 wherein the further wall is an end wall.

20. The exercise device of claim 15 including a further mechanism for adjusting the spring tension load on a further plunger mounted on a further wall, the mechanism for adjusting the tension of the further plunger one of simultaneously with and separately with respect to the first plurality of plungers.

21. The exercise device of claim 15 including a further plunger mounted on an end wall for exercising the thumb.

* * * * *